(12) United States Patent
Cohen

(10) Patent No.: US 6,957,286 B1
(45) Date of Patent: Oct. 18, 2005

(54) SYSTEM AND DEVICE FOR SWITCHING OPERATING SYSTEM

(75) Inventor: Roy Cohen, Yokneam Illit (IL)

(73) Assignee: Hard Guard Ltd., Haifa (IL)

( * ) Notice: Subject to any disclaimer, the term of this patent is extended or adjusted under 35 U.S.C. 154(b) by 374 days.

(21) Appl. No.: 09/916,686

(22) Filed: Jul. 30, 2001

Related U.S. Application Data

(60) Provisional application No. 60/222,004, filed on Jul. 31, 2000.

(51) Int. Cl.[7] ............................................. G06F 3/00
(52) U.S. Cl. ................................. 710/38; 713/2
(58) Field of Search ........................ 710/8, 38, 74; 713/2, 100

(56) References Cited

U.S. PATENT DOCUMENTS

| | | | | |
|---|---|---|---|---|
| 5,604,890 A | * | 2/1997 | Miller | ......................... 703/23 |
| 6,325,636 B1 | * | 12/2001 | Hipp et al. | .................... 439/61 |
| 6,327,653 B1 | * | 12/2001 | Lee | ............................. 713/100 |
| 6,678,712 B1 | * | 1/2004 | McLaren et al. | ........... 718/100 |
| 6,727,920 B1 | * | 4/2004 | Vineyard et al. | ........... 345/810 |

* cited by examiner

Primary Examiner—Jeffrey Gaffin
Assistant Examiner—Harold Kim
(74) Attorney, Agent, or Firm—G.E. Ehrlich (L995) Ltd.

(57) ABSTRACT

A system and a device for enabling a plurality of hardware memory components to be installed on a computational device, in which the hardware components are isolated from each other and/or from the remainder of the computational device. Such "insulation" can optionally be used in order to provide security for the information stored on the hardware memory component. For example, one such component could optionally have access blocked when the computational device is connected to a network such as the Internet, in order to prevent an external, unauthorized user from gaining access to the information stored on such a hardware memory component. One possible application of the present invention is for security of operation of a computational device.

14 Claims, 3 Drawing Sheets

SYSTEM AND DEVICE FOR SWITCHING OPERATING SYSTEM

This Application claims priority from U.S. Provisional Application No. 60/222,004, filed on Jul. 31, 2000, which is currently pending and which is incorporated by reference as if fully set forth herein.

FIELD OF THE INVENTION

The present invention relates to a system and a device for separate operation of at least two hardware memory components on a computational device, such that these two components are optionally "insulated" from each other and/or from the remainder of the computational device. According to a preferred embodiment of the present invention, the computational device is operated by one of two operating systems, in which each operating system is stored on, and operated from, a separate hardware memory component on the computational device, such that the operation of the computational device is determined according to the selected hardware memory component.

BACKGROUND OF THE INVENTION

Many different operating systems are currently available for operating computational devices. For example, the PC computer can be operated according to the Windows™ operating systems (Microsoft Corp., USA), as well as according to the PC version of the Linux operating system. Different operating systems may be useful for running different types of software, or may have other features which makes them particularly suitable for certain types of applications. Thus, a user may wish to operate more than one operating system on a single computational device.

Currently, computational devices may operate more than one operating system, for example by partitioning the hard drive or other storage device on the computational device. The partitioned hard drive would then have a different operating system on each partitioned section. The user would need to reboot the computational device in order to switch between operating systems. Although such a solution is effective, it is beyond the capabilities of many users, since it requires the user to be able to partition the hard drive, and then to be able to install each operating system on each partitioned section. Furthermore, such a solution is incomplete, since the user may wish to also install different hardware devices, such as network cards, which would be operated separately by each operating system. For example, the user might wish to have a first network card operated by a first operating system, while a modem would be operated by a second operating system. Unfortunately, such a solution is not currently available.

SUMMARY OF THE INVENTION

The background art does not teach or suggest a mechanism for separate operation of two or more hardware memory components on the computational device, such that each such component is insulated from the remainder of the computational device. The background art also does not teach or suggest the use of such a mechanism for providing a plurality of operating systems for operation of a computational device. Also, the background art does not teach or suggest the concept of a second hardware storage device, to which access is permitted according to the state of external connections to the computational device.

The present invention overcomes these deficiencies of the background art by providing a system and a device for enabling a plurality of hardware memory components to be installed on a computational device, in which the hardware components are isolated from each other and/or from the remainder of the computational device. Such "insulation" can optionally be used in order to provide security for the information stored on the hardware memory component. For example, one such component could optionally have access blocked when the computational device is connected to a network such as the Internet, in order to prevent an external, unauthorized user from gaining access to the information stored on such a hardware memory component.

According to a preferred embodiment of the present invention, the plurality of hardware memory components, at least one of which is insulated or isolated from the remainder of the computational device, is used to enable a plurality of operating systems to be installed on a single computational device, such that the computational device is separately operable according to each operating system. Each operating system is installed on a separate hard drive or other storage device of the computational device. The hardware boot manager device of the present invention is then able to switch the operating system of the computational device, by switching between the hard drives or other hardware storage devices, such that the computational device is operated according to the operating system information which is stored on the controlling hardware storage device. It should be noted that the operating systems do not necessarily need to be of different types, but are referred to as "separate" herein as each such operating system is installed separately on each hardware storage device.

Preferably, a first hardware storage device and operating system combination is employed when the computational device is connected to a first type of network, such as a LAN (local area network) for example; while a second hardware storage device and operating system combination is employed when the computational device is connected to a second type of network, such as a WAN (wide area network) for example.

According to one exemplary application of the present invention, the separation of different operating systems onto different storage devices provides for greater security. For example, if one hardware storage device were to fail, then the computational device could still be operated according to the operating system which is stored on a hardware storage device. Similarly, corruption of files and/or attacks by rogue software programs, such as computer viruses for example, could be isolated to a particular hardware storage device, thereby minimizing any damage caused thereof. Thus, the present invention provides greater security for the operation of the computational device, with a corresponding ease of operation by the user, as the present invention is preferably implemented as a "black box" hardware device and system, in which a minimal operation by the user causes the switch to occur.

According to another preferred embodiment of the present invention, the hardware memory component is preferably implemented as a separate chip, which has "read-only" access. This separate chip is used to store the operating system of the computational device, thereby protecting that operating system from being corrupted by a virus, Trojan horse, or other unauthorized access. Optionally, the separate chip is one of the hardware memory components which are used to provide a plurality of operating systems for operating the computational device, as previously described.

According to another preferred embodiment of the present invention, a hard drive is provided to which access is permitted according to the state of external connections to the computational device. For example, access may optionally only be permitted if no external connections are present. Alternatively, access may be permitted depending upon the type of external connections, such that access may optionally be permitted if the computational device is connected to a LAN but not to the Inernet, for example.

According to the present invention, there is provided a system for providing a plurality of operating systems for operating a computational device, the system comprising: (a) a first hard disk drive for storing a first operating system, the first hard disk drive being operated by the computational device; (b) a second disk drive for storing a second operating system, the second hard disk drive being operated by the computational device; and (c) a hard disk drive communication controlling device for controlling a function of each of the first hard disk drive and the second hard disk drive, such that only one of the first hard disk drive and the second hard disk drive is operable at a particular time.

According to a second embodiment of the present invention, there is provided a hardware boot management device for a computational device, comprising: (a) a plurality of peripheral devices for being operated by the computational device; and (b) a hardware manager for determining whether each of the plurality of peripheral devices is operable.

According to yet another embodiment of the present invention, there is provided a method for providing security for operation of a computational device, the method comprising: providing a plurality of hardware storage devices, each hardware storage device featuring operating system information; selecting a hardware storage device for operation; and operating the computational device according to the operating system information being stored on the selected hardware storage device.

According to still another embodiment of the present invention, there is provided a system for providing isolated memory for a computational device, the system comprising: (a) a hardware memory component being operated by the computational device; and (b) a hard disk drive communication controlling device for controlling a function of the hardware memory component such that the hardware memory component is isolated from a remainder of the computational device to provide the isolated memory.

According to another embodiment of the present invention, there is provided a system for providing a secure operating system for a computational device, comprising a read-only hardware memory component for storing the secure operating system.

According to still another embodiment of the present invention, there is provided a method for providing security for operation of a computational device, the computational device being capable of at least one external connection, the method comprising: providing a plurality of hardware storage devices, wherein at least one hardware storage device is always operational; determining a state of the at least one external connection; selecting at least a second hardware storage device for operation according to the state; and operating the selected hardware storage device.

Hereinafter, the term "network" refers to a connection between any two or more computational devices which permits the transmission of data.

Hereinafter, the term "computational device" includes, but is not limited to, personal computers (PC); Macintosh™ computers; computers having JAVA™-OS as the operating system; graphical workstations and other computers having some version of the UNIX operating system; or any other known and available operating system, or any device, including but not limited to: laptops, hand-held computers, PDA (personal data assistant) devices, cellular telephones, any type of WAP (wireless application protocol) enabled device, wearable computers of any sort, and any type of device which has a processor and which has an operating system; as well as any type of computer.

Hereinafter, the term "hardware memory component" includes, but is not limited to, any type of hardware storage device and also any type of chip or other component for storing information, regardless of whether the memory component is both readable and writable, or is only readable.

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

In addition, the present invention could be implemented as software, firmware or hardware, or as a combination thereof. For any of these implementations, the functions performed by the method could be described as a plurality of instructions performed by a data processor.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
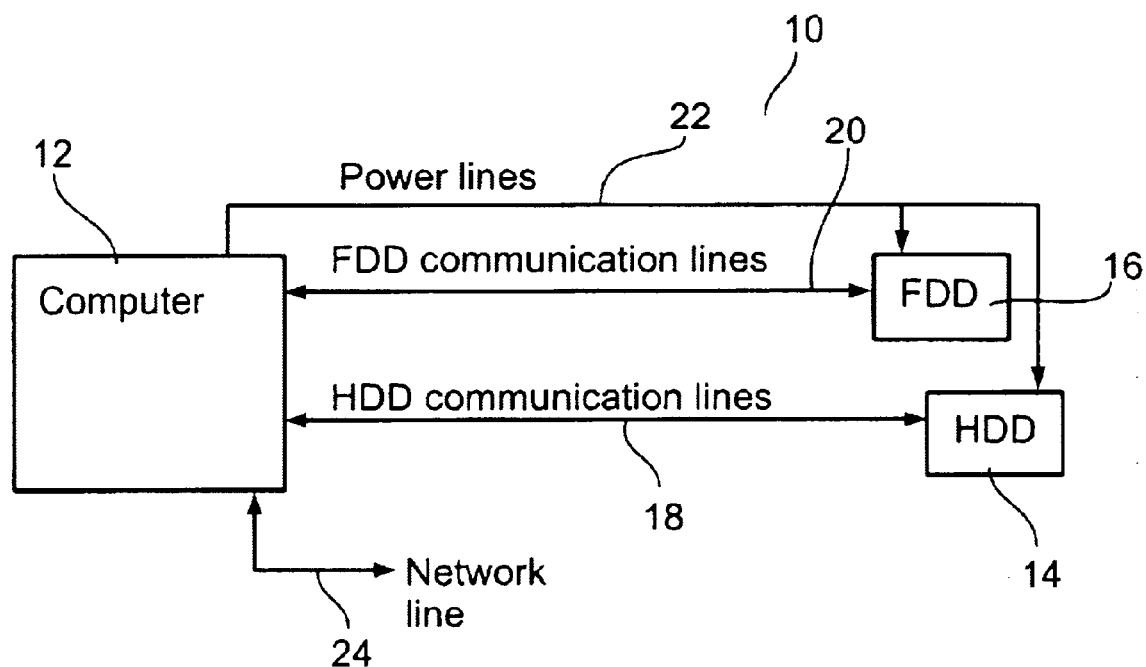
FIG. 1 is a schematic block diagram of a background art system.

The present invention is of a system and a device for enabling a plurality of hardware memory components to be installed on a computational device, in which the hardware components are isolated from each other and/or from the remainder of the computational device. Such "insulation" can optionally be used in order to provide security for the information stored on the hardware memory component. For example, one such component could optionally have access blocked when the computational device is connected to a network such as the Internet, in order to prevent an external, unauthorized user from gaining access to the information stored on such a hardware memory component.

According to a preferred embodiment of the present invention, the plurality of hardware memory components, at least one of which is insulated or isolated from the remainder of the computational device, is used to enable a plurality of operating systems to be installed on a single computational device, such that the computational device is separately operable according to each operating system. Each operating system is installed on a separate hard drive or other storage device of the computational device. The hardware boot manager device of the present invention is then able to switch the operating system of the computational device, by switching between the hard drives or other hardware storage devices.

Preferably, a first hardware storage device and operating system combination is employed when the computational device is connected to a first type of network, such as a LAN (local area network) for example; while a second hardware storage device and operating system combination is employed when the computational device is connected to a second type of network, such as a WAN (wide area network) for example.

According to one exemplary application of the present invention, the separation of different operating systems onto different storage devices provides for greater security. For example, if one hardware storage device were to fail, then the computational device could still be operated according to the operating system which is stored on a hardware storage device. Similarly, corruption of files and/or attacks by rogue software programs, such as computer viruses for example, could be isolated to a particular hardware storage device, thereby minimizing any damage caused thereof. Thus, the present invention provides greater security for the operation of the computational device, with a corresponding ease of operation by the user, as the present invention is preferably implemented as a "black box" hardware device and system, in which a minimal operation by the user causes the switch to occur.

According to another preferred embodiment of the present invention, the hardware memory component is preferably implemented as a separate chip, which has "read-only" access. This separate chip is used to store the operating system of the computational device, thereby protecting that operating system from being corrupted by a virus, Trojan horse, or other unauthorized access. Optionally, the separate chip is one of the hardware memory components which are used to provide a plurality of operating systems for operating the computational device, as previously described.

According to another preferred embodiment of the present invention, a hard drive is provided to which access is permitted according to the state of external connections to the computational device. For example, access may optionally only be permitted if no external connections are present. Alternatively, access may be permitted depending upon the type of external connections, such that access may optionally be permitted if the computational device is connected to a LAN but not to the Internet, for example.

Also, access to an additional hardware storage device may optionally be permitted according to a requirement for restoring data to the computational device. For example, secondary drives can be connected for backup or restoration of the information, such as in order to overcome damage from viruses or other data modulation or penetration.

The principles and operation of the present invention may be better understood with reference to the drawings and the accompanying description. Although the operation of the present invention is described with regard to particular types of hardware storage devices, operating systems and/or controllers, it should be understood that this is for the purposes of clarity only and is not meant to be limiting in any way, as the present invention is operational with substantially any type of hardware storage device, operating system and/or controller.

Referring now to the drawings, FIG. 1 is a schematic block diagram of a system according to the background art. A background system 10 features a computational device 12, for operating a hard disk storage device 14 and a floppy disk drive storage device 16. Hard disk storage device 14 is connected to computational device 12 with a hard disk communication line 18, while floppy disk drive storage device 16 is connected to computational device 12 with a floppy disk drive communication line 20. Power is supplied to each of hard disk storage device 14 and floppy disk drive storage device 16 through respective power lines 22. In addition, computational device 12 is connected to a network line 24. The disadvantage of system 10 is that hard disk storage device 14 must be partitioned in order to support multiple operating systems for operating computational device 12, as previously described.

Figure 2:
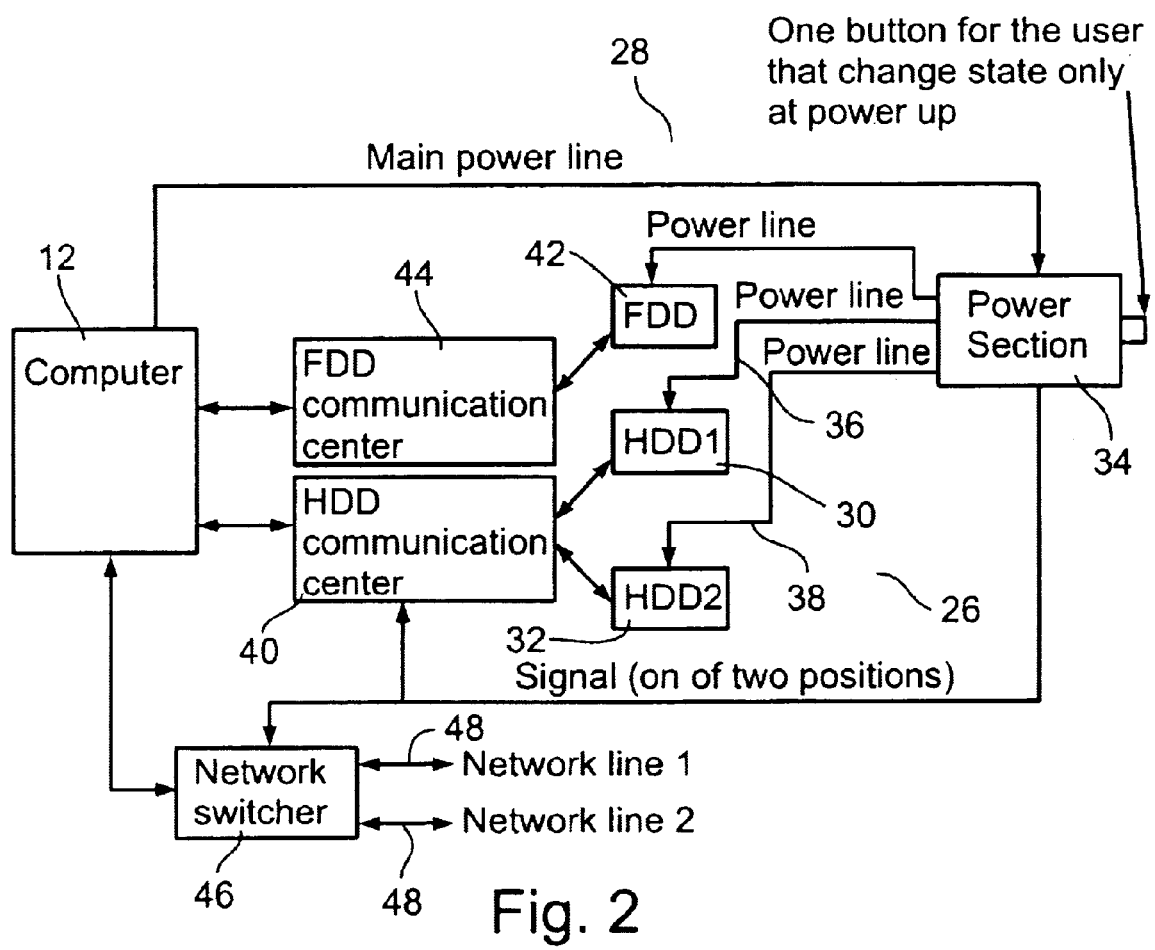
FIG. 2 is a schematic block diagram of an exemplary system according to the present invention.

As shown in FIG. 2, a hardware boot management device 26 provides a solution to this problem. Hardware boot management device 26 is operated by computational device 12, as for the system of FIG. 1. However, now a system 28 according to the present invention enables different operating systems to be used for operating computational device 12.

Hardware boot management device 26 controls a first hard disk drive 30 and a second hard disk drive 32, each of which is separately connected to a power supply 34 through a first hard disk power line 36 and a second hard disk power line 38, respectively. Hardware boot management device 26 controls first hard disk drive 30 and second hard disk drive 32 through a hard disk drive communication controlling device 40, which is also in communication with power supply 34. Thus, hard disk drive communication controlling device 40 controls the supply of power to each of first hard disk drive 30 and second hard disk drive 32, such that only one of first hard disk drive 30 and second hard disk drive 32 receives power at any time.

According to a preferred embodiment of the present invention, hard disk drive communication controlling device 40 also controls communication with computational device 12, as it is preferred that all communication between each of first hard disk drive 30 and second hard disk drive 32 passes through hard disk drive communication controlling device 40, such that communication with only one of first hard disk drive 30 and second hard disk drive 32 is permitted with computational device 12.

Alternatively, depending upon the level of security desired, communication with one of first hard disk drive 30 and second hard disk drive 32 is always permitted with computational device 12. However, communication with the other one of first hard disk drive 30 and second hard disk drive 32 would then preferably only be permitted with computational device 12 under certain conditions; for example, if computational device 12 is not connected to a network such as the Internet. Alternatively, first hard disk drive 30 could optionally be accessed when computational device 12 if computational device 12 is connected to a particular type of network, such as a LAN (local area network) for example. Second hard disk drive 32 could optionally be accessed when computational device 12 if computational device 12 is connected to a different type of network, such as a WAN (wide area network) for example. The user would more preferably be able to manually select whether access to the other one of first hard disk drive 30 and second hard disk drive 32 is permitted with computational device 12, for example, with a manual switch.

In addition, optionally and most preferably, hardware boot management device 26 controls a floppy disk drive 42 through a floppy disk drive communication controlling device 44. As for hard disk drive communication controlling device 40, floppy disk drive communication controlling device 44 preferably controls both the supply of power to floppy disk drive 42, as well as communication between floppy disk drive 42 and computational device 12.

According to preferred embodiments of the present invention, power supply 34 acts as the main switch that chooses the boot state of computational device 12, from at least two such states, with one state being assigned to each of first hard disk drive 30 and second hard disk drive 32. Power supply 34 can optionally and preferably only be altered manually at the very first fraction of a second during the computer power up. If computational device 12 is powered up without operating the mechanism that changes the boot state, computational device 12 preferably always boots to the same state.

Each of the first hard disk drive 30 and second hard disk drive 32 preferably has a separate operating system for operating computational device 12. Therefore, the selection of a particular operating system for operating computational device 12 depends upon which of first hard disk drive 30 and second hard disk drive 32 has been activated.

Optionally, at least one of first hard disk drive 30 and second hard disk drive 32 is a hardware memory component which is only readable, such as a chip for example. Such a component would have the further advantage of being inaccessible to corruption by a virus, Trojan horse or other unauthorized access. For such an implementation, also optionally, only one such memory component is provided for operating a single operating system, such that computational device 12 would only be operated by the single operating system.

According to preferred embodiments of the present invention, hardware boot management device 26 also controls a network switcher 46, for determining access of computational device 12 to at least one, and preferably a plurality of, network lines 48. Network switcher 46 is optionally implemented as a simple switch that normally connects one network line 48 to the network card, by providing power as a signal from power supply 34, preferably, only one network line 48 can be in communication with computational device 12 at any given moment.

As an example, system 28 is optionally configured to be in one of the two following states. In the first state, hard drive 30 which is labeled "1" is connected, network line 48 which is labeled "1" is connected and floppy disk drive 42 is connected. In the second state, hard drive 30 which is labeled "2" is connected, network line 48 which is labeled "2" is connected and floppy disk drive 42 is not connected.

When the user powers up computational device 12, computational device 12 enters one of the two states. To change to the other state, the user more preferably must turn off computational device 12, and then power on computational device 12 while holding the state changing button or otherwise manipulating the state changing mechanism of hardware boot management device 26. This is preferably the only way to turn to the second state.

Figure 3A:
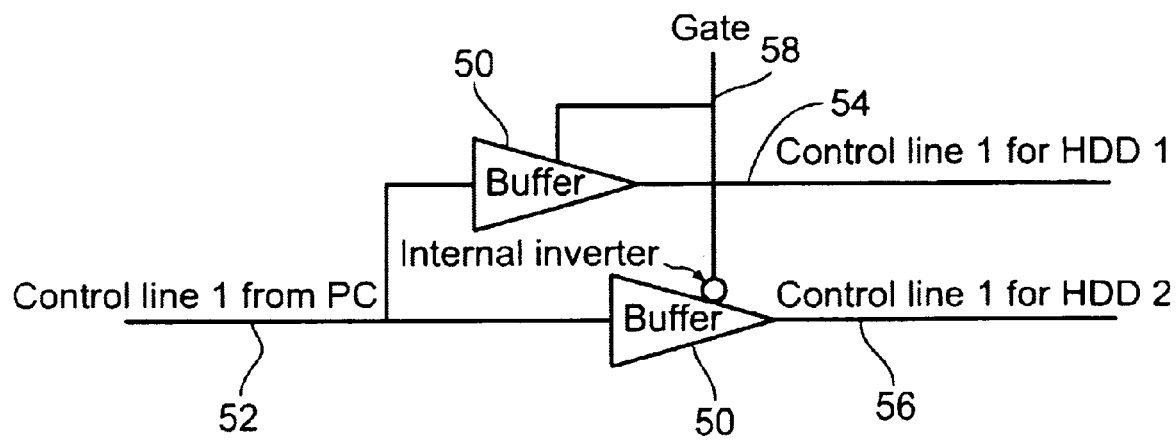
FIGS. 3A and 3B are schematic block diagrams of exemplary integrated circuits for implementation with the system of FIG. 2.
Figure 3B:
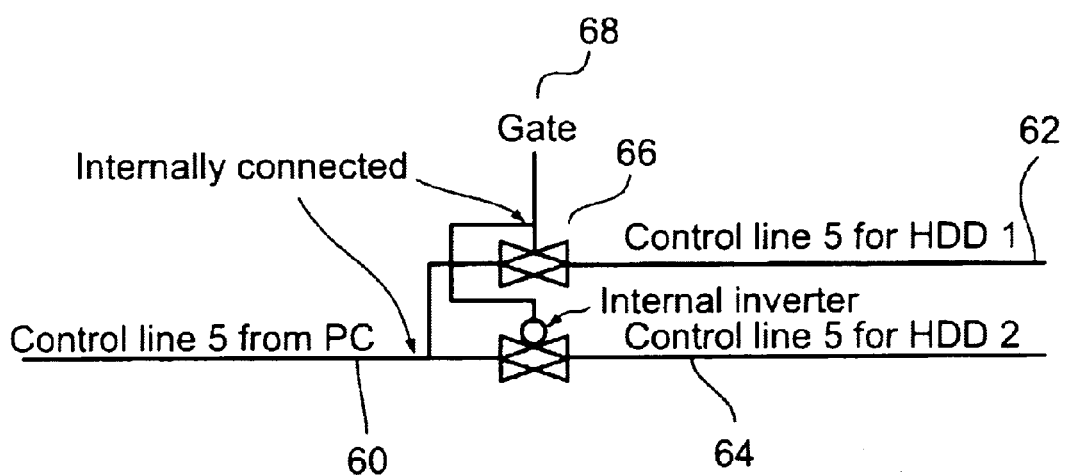

According to a preferred embodiment of the present invention, as shown with regard to FIGS. 3A and 3B, a particular implementation of hardware boot management device 26 is employed as shown.

Each hard drive has two power lines: 12 volt and 5 volt. The 12v power line is meant to power the motors of the hard drive, and the 5v line is intended to power the logical circuitry of the hard drive. The power section of the hard disk drive communication controlling device of FIG. 2 is preferably only disconnecting the 12v line to the non-working hard drive, such that the motors of the hard disk drive are inoperable, while the 5v more preferably remains connected. If both power lines were disconnected, all of the communication lines would also need to be disconnected too, which requires numerous components, because these communication lines would otherwise disrupt the data transfer of the computational device itself. Thus, permitting power to remain for the 5v lines enables the communication lines to remain connected. Furthermore, certain communication lines are disrupted which tell the hard drive when to communicate. When these lines are disconnected the hard drive is completely disabled and cannot communicate, such that these lines are also preferably disconnected.

As shown in FIGS. 3A and 3B, the hard disk drive has two Integrated Circuits (IC). As shown in FIG. 3A, a first IC is an eight buffer (called-74HC241). A buffer 50 is an electronic switch which permits or blocks transfer of digital information between a control line 52 from the computational device (not shown) and each of a control line 54 for the first hard disk drive and a control line 56 for the second hard disk drive (not shown), depending on the status of a gate 58 of the switch (hi or low). This IC is connected in a way that when four buffers are "on" the other four buffers are "off" depending on a single gate line.

Each pair of buffers 50 (one ON and one OFF at the same gate state) is controlling one control line 54 or 56 on both hard drives (the same control line). While one buffer 50 transfers the control line information from the computational device to one hard drive, the other buffer 50 is blocking the same control line information from the computational device to the other hard drive, disconnecting the control line of the other hard drive.

As shown in FIG. 3B, the other IC, which used to block/unblock the fifth control line, is more complicated. Information flows on both directions on the fifth control line, from a fifth control line 60 of the computational device to a fifth control line 62 and 64 for each of the first and second hard disk drives, respectively. Therefore a buffer cannot be used to transfer information. Instead, this IC is an analog switch with 3 independent bipolar switches, of which only one independent bipolar switch 66 is shown here. Each independent bipolar switch 66 has a separate control gate 68.

Two control gates 58 and 68 of the IC of each of FIGS. 3A and 3B are preferably connected together, forming the input for the signal line from the power section.

According to a preferred embodiment of the present invention, the user operates the hardware boot management device through a particular mechanism. The logic of the state-changing mechanism is accomplished with a self-holding relay and a timed transistor circuit in line with the state-changing mechanism itself (not shown).

A self-holding relay is a relay which stays "on", or powered up, once power has been initially supplied, even if the power supply itself is disconnected. This relay determines the boot state of the system. The power that holds the relay is used as the power signal to the other sections. The timed transistor is a resistor and a capacitor which is connected to the base of the transistor, forming a device that gives power only for a short time from initial supply of power. This timed power is connected through the state-changing button to the self-holding relay. That way the timed power activating the self-holding relay ONLY if the button is pressed AND ONLY at initial power. After initial power, the state-changing button does not affect the relay state.

According to another embodiment of the present invention, a plurality of different types of bus controllers may be used, such as IDE bus controllers, SCSI or RAID drive controllers, for example. These different controllers may be used to control access to different hardware storage devices, and optionally to provide access to more than one such hardware storage device simultaneously. By adding a second controller, access to additional hardware storage devices and/or memory may be provided.

As previously described, the present invention has a number of different applications. Without wishing to be limited in any way, one preferred application of the present invention is for providing greater security for the operation of a computational device. For example, the present invention helps to protect against file corruption and/or damaged files, such that damage which is caused by rogue software programs and/or power fluctuations for example, by providing a back-up operating system on a separate hardware storage device. The provision of the separate hardware storage device also helps to protect against device failure. Of course, other applications of the present invention are also possible.

While the invention has been described with respect to a limited number of embodiments, it will be appreciated that many variations, modifications and other applications of the invention may be made.

What is claimed is:

1. A system for providing a plurality of operating systems for operating a computational device, the system comprising:
   (a) a first memory device for storing a first operating system, said first memory device being operated by the computational device;
   (b) a second memory device for storing a second operating system, said second memory device being operated by the computational device; and
   (c) a memory device communication controlling device for controlling a function of each of said first memory device and said second memory device, such that only one of said first memory device and said second memory device is operable at a particular time;
   (d) a power supply for supplying power to each of said first memory device and said second memory device, such that only one of said first memory device and said second memory device receives power at a time, as determined by said memory device communication controlling device
   (e) a first power line from said power supply to power a motor of each of said first memory device and said second memory device; and
   (f) a second power line from said power supply to power a logical circuitry of each of said first memory device and said second memory device, such that at least one of said first power line and said second power line is disconnected from said power supply to block power to one of said first memory device and said second memory device;
   wherein only said first power line is disconnected to said motor of one of said first memory device and said second memory device to block said power.

2. The system of claim 1, further comprising:
   (d) a first communication line for communicating with said first memory device; and
   (e) a second communication line for communicating with said second memory device, such that one of said first and second communication lines is blocked to block communication to one of said first memory device and said second memory device.

3. The system of claim 1, further comprising:
   (d) a communication line for communicating between the computational device and each of said first memory device and said second memory device, such that only one of said first memory device and said second memory device communicates with the computational device at a particular time, as determined by said memory device communication controlling device.

4. The system of claim 1, further comprising:
   (d) a network card for communicating with each of a plurality of network lines; and
   (e) a network switcher for determining a connection to one of said plurality of network lines.

5. The system of claim 1, further comprising:
   (d) a floppy disk drive; and
   (e) a floppy disk drive communication controlling device for controlling a function of said floppy disk drive, to determine if said floppy disk drive is operable.

6. The system of claim 1, wherein said memory device communication controlling device switches between said first memory device and said second memory device only after blocking power to the computational device.

7. The system of claim 6, wherein said memory device communication controlling device is manually controlled by a user.

8. The system of claim 1, wherein at least one of said first memory device and said second memory device is a hard disk drive.

9. The system of claim 1, wherein both of said first memory device and said second memory device are hard disk drives.

10. A system for providing a plurality of operating systems for operating a computational device, the system comprising:
    (a) a first memory device for storing a first operating system, said first memory device being operated by the computational device;
    (b) a second memory device for storing a second operating system, said second memory device being operated by the computational device; and
    (c) a memory device communication controlling device for controlling a function of each of said first memory device and said second memory device, such that only one of said first memory device and said second memory device is operable at a particular time wherein said network switcher permits access to a first type of network line if said first memory device is accessible, and permits access to a second type of network line if said second memory device is accessible.

11. The system of claim 10, wherein said first type of network line is a LAN (local area network).

12. The system of claim 10, wherein said second type of network line is at least one of a WAN (wide area network) and the Internet, or a combination thereof.

13. The system of claim 10, wherein at least one of said first memory device and said second memory device is a hard disk drive.

14. The system of claim 10, wherein both of said first memory device and said second memory device are hard disk drives.

* * * * *

UNITED STATES PATENT AND TRADEMARK OFFICE
CERTIFICATE OF CORRECTION

| | |
|---|---|
| PATENT NO. | : 6,957,286 B1 |
| APPLICATION NO. | : 09/916686 |
| DATED | : October 18, 2005 |
| INVENTOR(S) | : Roy Cohen |

It is certified that error appears in the above-identified patent and that said Letters Patent is hereby corrected as shown below:

Please rewrite col. 10, line 34, claim 10 as follows:

10. A system for providing a plurality of operating systems for operating a computational device, the system comprising:

(a) a first memory device for storing a first operating system, said first memory device being operated by the computational device;

(b) a second memory device for storing a second operating system, said second memory device being operated by the computational device;

(c) a memory device communication controlling device for controlling a function of each of said first memory device and said second memory device, such that only one of said first memory device and said second memory device is operable at a particular time (d) a network card for communicating with each of a plurality of network lines; and (e) a network switcher for determining a connection to one of said plurality of network lines,

UNITED STATES PATENT AND TRADEMARK OFFICE
CERTIFICATE OF CORRECTION

PATENT NO. : 6,957,286 B1
APPLICATION NO. : 09/916686
DATED : October 18, 2005
INVENTOR(S) : Roy Cohen It is certified that error appears in the above-identified patent and that said Letters Patent is hereby corrected as shown below:

wherein said network switcher permits access to a first type of network line if said first memory device is accessible, and permits access to a second type of network line if said second memory device is accessible.

Signed and Sealed this

Eighteenth Day of August, 2009

David J. Kappos
*Director of the United States Patent and Trademark Office*